(12) United States Patent
Heidari et al.

(10) Patent No.: US 8,711,741 B1
(45) Date of Patent: Apr. 29, 2014

(54) METHOD AND APPARATUS FOR NETWORKED MODEMS

(75) Inventors: Sam Heidari, Menlo Park, CA (US); Hossein Dehghan, Danville, CA (US); Sigurd Schelstraete, Mountain View, CA (US)

(73) Assignee: Ikanos Communications Inc., Fremont, CA (US)

( * ) Notice: Subject to any disclaimer, the term of this patent is extended or adjusted under 35 U.S.C. 154(b) by 934 days.

(21) Appl. No.: 11/807,006

(22) Filed: May 24, 2007

Related U.S. Application Data

(60) Provisional application No. 60/803,116, filed on May 24, 2006.

(51) Int. Cl.
| | |
|---|---|
| *H04J 1/12* | (2006.01) |
| *H04J 1/16* | (2006.01) |
| *H04B 3/20* | (2006.01) |
| *H04J 4/00* | (2006.01) |
| *H04L 5/16* | (2006.01) |

(52) U.S. Cl.
USPC ........... 370/286; 370/201; 370/252; 370/478; 375/222

(58) Field of Classification Search
USPC ......... 370/201, 251–252, 282, 286, 289, 294, 370/295, 478; 375/222; 725/111
See application file for complete search history.

(56) References Cited

U.S. PATENT DOCUMENTS

| | | | | |
|---|---|---|---|---|
| 6,011,781 | A * | 1/2000 | Bell .............................. | 370/254 |
| 6,075,814 | A * | 6/2000 | Yamano et al. ............... | 375/222 |
| 6,898,210 | B1 * | 5/2005 | Cheng et al. .................. | 375/222 |
| 7,035,323 | B1 * | 4/2006 | Arato et al. ................... | 375/222 |
| 7,151,803 | B1 * | 12/2006 | Sonalkar ....................... | 375/260 |
| 7,577,129 | B2 * | 8/2009 | Pantelias et al. .............. | 370/347 |
| 2002/0196732 | A1 * | 12/2002 | Mestdagh ..................... | 370/206 |
| 2003/0108094 | A1 * | 6/2003 | Lai et al. ....................... | 375/222 |
| 2004/0213293 | A1 * | 10/2004 | Basso et al. ................... | 370/480 |
| 2006/0280235 | A1 * | 12/2006 | Rhee et al. .................... | 375/222 |

OTHER PUBLICATIONS

O. Isson, D. Mesdagh; Zipper Discrete Multi-Tone Echo Canceller; IEEE Electronics Letters 3rd Feb. 2000, vol. 36, No. 3.

* cited by examiner

*Primary Examiner* — Redentor Pasia
(74) *Attorney, Agent, or Firm* — Pillsbury Winthrop Shaw Pittman LLP

(57) ABSTRACT

Networked modems configurable to establish a communication system on a wired communication medium. Each modem includes: a network module, transmit and receive path modules and a frequency domain echo canceller. The network module is configured to communicate with network modules of remaining ones of the at least three modems to allocate bandwidth of the shared communications medium for at least two discrete point-to-point communication links between corresponding pairs of the at least three modems. The transmit and receive path modules are configured for multi-tone modulation and demodulation of communications on the wired communication medium and are responsive to the bandwidth allocation of the network module to concurrently process at least a first discrete point-to-point communication link with a first modem among remaining ones of the at least three modems and at least a second discrete point-to-point communication link with a second among remaining ones of the at least three modems. The frequency domain echo canceller is configured to substantially cancel leakage of the communications transmitted on the transmit path into the receive path and to enable each point-to-point communication link to support full duplex communications.

12 Claims, 7 Drawing Sheets

Networked Modems

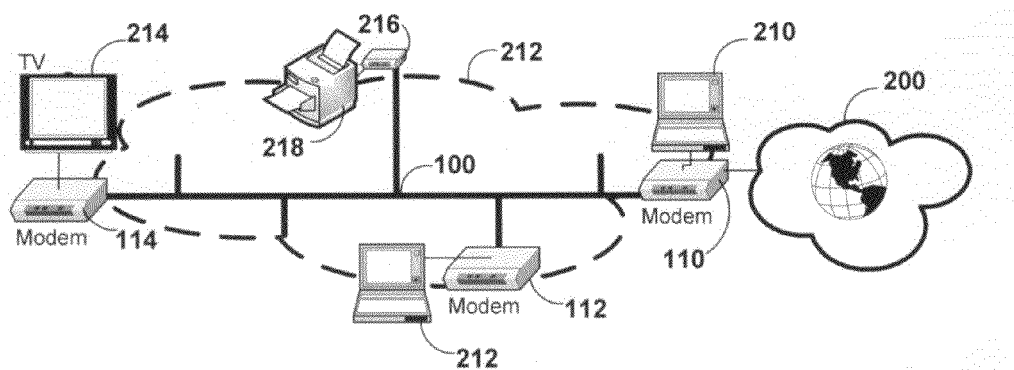
Virtual Network     FIG. 2A
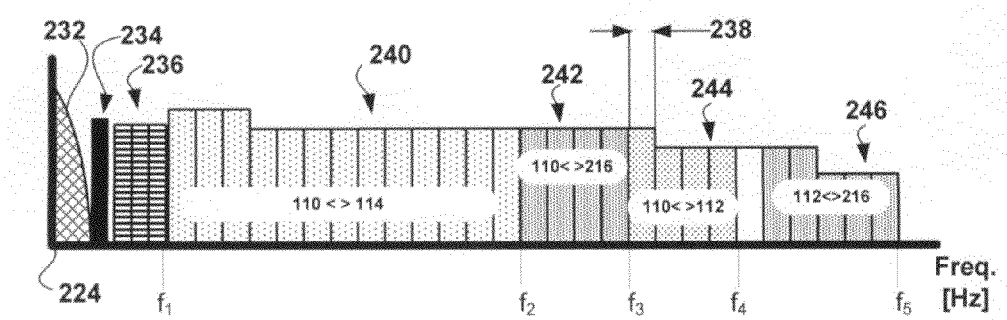
FIG. 2B
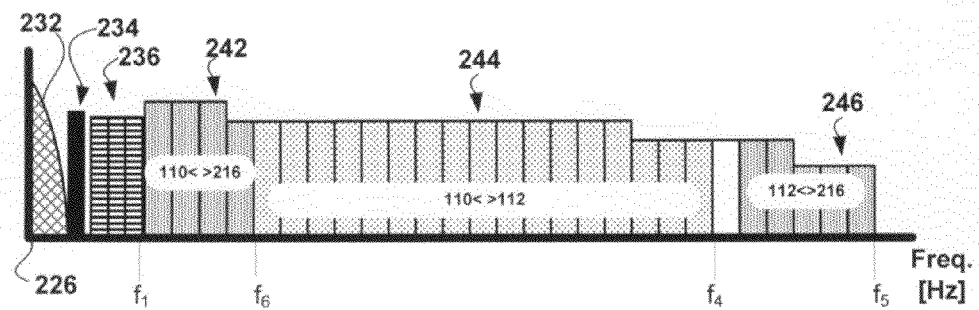
FIG. 2C
Bandwidth Allocation using Frequency Division

Interval = $t_n <> t_{n+1}$

Interval = $t_{n+1} <> t_{n+3}$

Interval = $t_{n+3} <> t_{n+4}$

**Bandwidth Allocation using
Hybrid Frequency & Time Division**

FDMA via Synchronization of FFT Integration Intervals

Hybrid Time and Frequency Division Multiple Access

FIG. 7      Network Module Processes

Multi Channel Echo Cancellation in Frequency Domain

METHOD AND APPARATUS FOR NETWORKED MODEMS

CROSS REFERENCE TO RELATED APPLICATION

This application claims the benefit of prior filed Provisional Application No. 60/803,116 filed on May 24, 2006 entitled "The Frequency Domain Echo Cancellation for Home Networking Systems" which is incorporated herein by reference in its entirety as if fully set forth herein.

BACKGROUND OF THE INVENTION

1. Field of Invention

The present invention is generally related to modems, and more particularly to a modem network.

2. Description of the Related Art

A range of technologies have been developed for providing broadband access to residential housing. These technologies include: passive optical network (PON), cable, satellite and digital subscriber line (DSL). Each technology relies on a different communications medium, either wired, wireless or fiber for the transport of data. Typically each of these technologies is used to provide broadband access up to but not within the home. Inside the home the broadband access will be distributed to one or more TV's, computers, or other devices by means of a wired or wireless connection. In the case of a wired router, connections to each TV or computer are typically provided by Ethernet cables strung throughout the home, each connection individually. In the case of a wireless router connections are made through one or more base stations and receivers sharing air medium. Existing home distribution networks include: copper/aluminum wire for phone connections throughout the home, existing cable connections for cable TV in various rooms of the home, and existing copper/aluminum wire by which electricity is provided throughout all the rooms of the home.

What is needed is a method and apparatus for improving the ease, security and coverage of broadband access provisioning to residential dwellings.

SUMMARY OF THE INVENTION

A method and apparatus for a network modem is disclosed. The network modem may be utilized in existing homes to interface with existing interconnected shared wired media within the home, e.g. cable, or copper/aluminum phone or power circuits and to form a network within the home. This avoids the coverage limitations, security issues, and expense of wireless home networks and avoids the costs of rewiring the home. In an embodiment of the invention network modems couple to an existing shared communications medium and utilize frequency and or time division multiplexing to create duplex communication channels with each of the active modems coupled to the shared communications medium. Collectively, all the duplex communication channels provide a network between all the active modems coupled to the shared communications medium.

In an embodiment of the invention a communication system configurable for establishing a network on a wired communication medium is disclosed. The communication system comprises at least three modems configured to couple to the wired communication medium. Each modem includes: a network module, transmit and receive path modules and a frequency domain echo canceller. The network module is configured to communicate with network modules of remaining ones of the at least three modems to allocate bandwidth of the shared communications medium for at least two discrete point-to-point communication links between corresponding pairs of the at least three modems. The transmit and receive path modules are configured for multi-tone modulation and demodulation of communications on the wired communication medium and are responsive to the bandwidth allocation of the network module to concurrently process at least a first discrete point-to-point communication link with a first modem among remaining ones of the at least three modems and at least a second discrete point-to-point communication link with a second among remaining ones of the at least three modems. The frequency domain echo canceller is configured to substantially cancel leakage of the communications transmitted on the transmit path into the receive path and to enable each point-to-point communication link to support full duplex communications.

BRIEF DESCRIPTION OF THE DRAWINGS

These and other features and advantages of the present invention will become more apparent to those skilled in the art from the following detailed description in conjunction with the appended drawings in which:

FIG. 2A is a network diagram showing various network attached devices coupled to the network formed by the modems in FIG. 1C.

FIG. 2B-2C are graphs of representative frequency allocations on the shared communications medium to which the modems shown in FIG. 2A are coupled.

DETAILED DESCRIPTION OF THE EMBODIMENTS

A modem is disclosed which utilizes a shared communications medium including in an embodiment of the invention existing home electrical wiring, coaxial cable, phone wiring, or optical cable for the formation of a network within the home. Each modem may include an Ethernet interface for coupling to a computer, TV or other device or appliance. The modems are identified as networked in that they are configured to communicate with more than one point, i.e. other modem, over a single communications medium shared by all modems over which discrete point-to-point links are formed between modem pairs by means of either or both frequency division multiplexing (FDMA) and time division multiplexing (TDMA). The network formed between modems over the shared communications medium is said to be virtual in that the aggregate of all discrete links between modems forms either a virtual communications network VCN in which each modem is able to communicate directly and simultaneously with any other modem, or a virtual broadcast network in which at least one modem is able to communicate directly and simultaneously with any other modem, in either case over a shared communications medium. Each modem supports full duplex communications, i.e. bi-directional communications in each allocated sub-channel/tone on each link.

In each of the Figures the reference numbers for elements introduced in each Figure correspond with the number of the Figure. For example elements referenced in FIG. 1 have reference numbers between 100 and 199. Elements referenced in FIG. 2 have reference numbers between 200 and 299, and so forth. For purposes of clarity elements first referenced in an earlier Figure may again appear in a subsequent Figure.

Figure 1A:
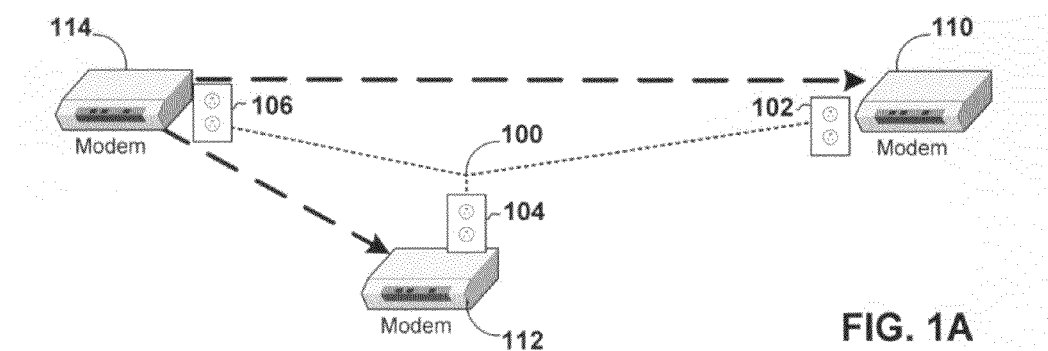
FIGS. 1A-1C are logical network diagrams showing modems during successive phases of network formation.
Figure 1B:
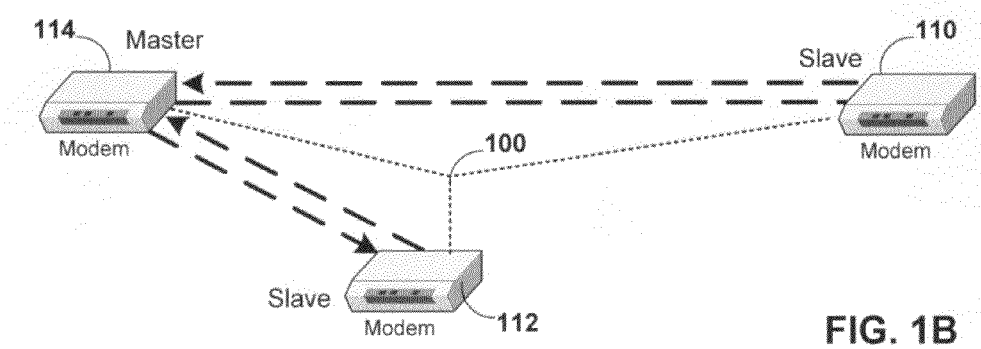
Figure 1C:
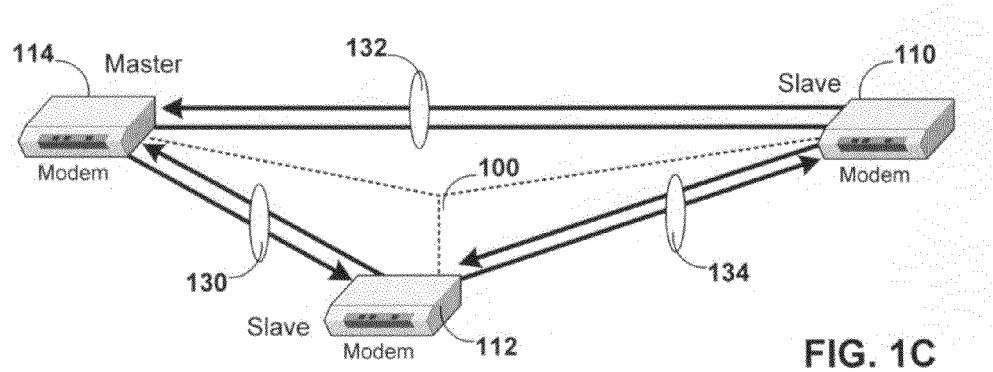

FIGS. 1A-1C are logical network diagrams showing modems during successive phases of network formation. Three modems 110-114 are shown coupled to one another via the 110V AC electrical outlets 102-106 found in most homes and businesses. The modems are equally capable of forming a network over alternate wired mediums found in homes and businesses such as: co-axial cable, optical cable, twisted pair phone lines, etc. The modems communicate with one another using a combination of time and frequency division multiplexing and a discrete multi-tone (multi sub-channel) modulation protocol (DMT).

In the first or initialization phase each modem shown in FIG. 1A is plugged into an AC wall outlet. The modems are each dual mode in that they can take on master or slave operational characteristics depending on the network state at any given time. The first modem to detect the absence of a pilot tone associated with an operational master on the network takes on the role of master for the network, with the remaining modems upon detecting the master pilot tone, automatically configuring themselves to slave mode. In FIG. 1A modem 114 asserts master status by seizing the master pilot tone/sub-channel and broadcasting timing and other control information to the other modems 110, 112 on the network.

In the second or allocation phase shown in FIG. 1B each of the modems communicates their bandwidth requirements to the master over one or more reserved slave tones/sub-channels. If fewer slave tones are reserved than the number of slaves on the network, slave communications to the master are moderated using a collision sense multiple access (CSMA) protocol. The master processes the bandwidth requests from all the slaves along with its own bandwidth requirements and then broadcasts on the master tone the resultant link/channel allocations to the various slaves on the network. These allocations may include either or both frequency and time division multiplexing of channel/link assignments for each of the slaves.

In the third or operational phase shown in FIG. 1C each of the allocated duplex links 130, 132, 134 is formed between modem pairs using the frequency and time division multiplexing allocated by the master.

FIG. 2A is a network diagram showing various network attached devices coupled to the network formed by the modems in FIG. 1C. Modems 110, 112, 114, 216 are shown coupled to notebook computer 210, notebook computer 212, television 214 and printer 216 respectively. All modems are coupled to a network 212 formed over the 110 V AC wiring shown in FIG. 1A. All modems also have access to the Internet 200 via modem 110.

FIG. 2B-2C are graphs of representative frequency allocations on the shared communications medium to which the modems shown in FIG. 2A are coupled. The spectral allocation on the shared communications medium in this embodiment of the invention includes one or more dedicated master 234 and slave 236 tones, a.k.a. sub-channels, over which the initialization and allocation phases of network configuration are accomplished. In the embodiment shown voice band public switched telephone line (PSTN) communications consistent for example with an existing household phone line as the network medium are shown occupying the lowest portion 232 of the frequency range.

Graph 224 in FIG. 2B shows the spectrum split into discrete DMT tones (a.k.a. sub-channels). Each modem implements a multi-tone modulation protocol such as the digital multi-tone (DMT) protocol used for existing digital subscriber line (DSL) modems worldwide. Each tone corresponds to a sub-channel. Each sub-channel has a center frequency about which quadrature phase amplitude modulation (QPAM) is used to carry information across each sub channel. Typically each sub-channel spans a 4.125 KHz frequency range. In alternate embodiments of the invention the sub-channel frequency range 238 may take on other values. FIG. 2B shows a bandwidth allocation in which the greatest amount of data transfer occurs over the duplex link between modems 110 and 114. The spectral allocation 240 for this link includes the DMT tones which span the frequency range $f_1$-$f_2$. Relatively narrow spectral allocations are shown for the remaining network links reflecting their relatively lesser data throughput requirements. The spectral allocation 242 for the link between modem 110 and the is modem 216 coupled to printer 218 spans the frequency range $f_2$-$f_3$. The spectral allocation 246 for the link between modem 112 and the modem 216 coupled to printer 218 spans the frequency range $f_4$-$f_5$. The spectral allocation 244 for the link between the modems 110-112 coupled to notebook computers 210-212 respectively spans the frequency range $f_3$-$f_4$.

As shown in FIG. 2C the dynamic re-configuration capability of the modems allows for changing frequency or time division allocations to suit changing demands between various network modems during the operational phase shown in FIG. 1C. FIG. 2C represents the case in which the TV 214 has been turned off and in which bandwidth allocation is split between computer-to-printer and computer-to-computer links. The spectral allocation 242 for the link between modem 110 and the modem 216 coupled to printer 218 spans the frequency range $f_1$-$f_6$. The spectral allocation 246 for the link between modem 112 and the modem 216 coupled to printer 218 spans the frequency range $f_4$-$f_5$. The spectral allocation 244 for the link between the modems 110-112 coupled to notebook computers 210-212 respectively spans the frequency range $f_6$-$f_4$.

Figure 3A:
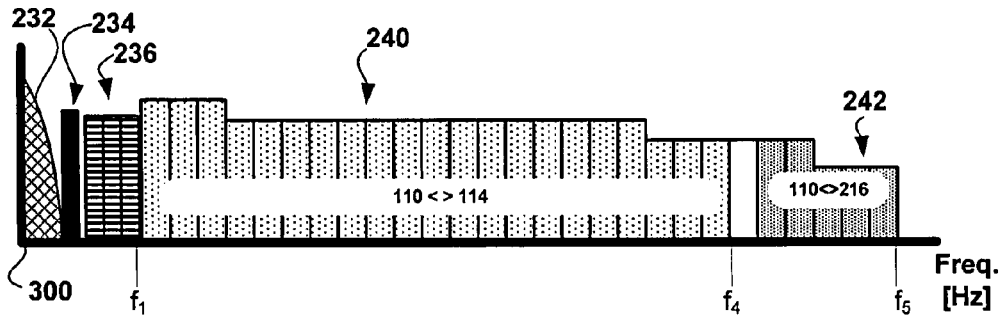
FIGS. 3A-3C are graphs of representative frequency and time allocations on the shared communications medium to which the modems shown in FIG. 2A are coupled.
Figure 3B:
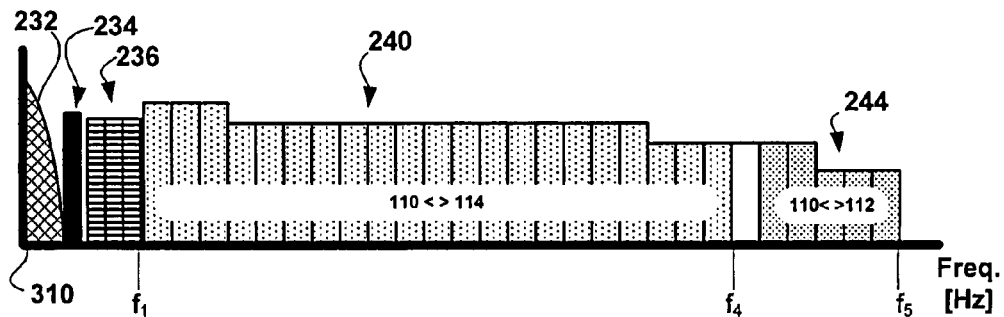
Figure 3C:
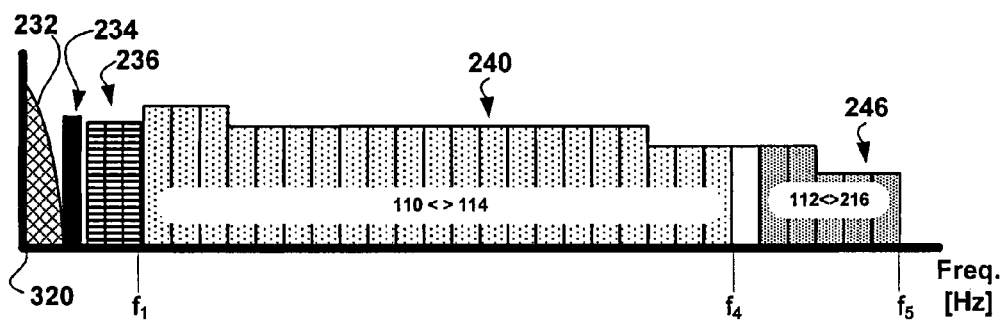

FIGS. 3A-3C are graphs of representative frequency and time allocations on the shared communications medium to which the modems shown in FIG. 2A are coupled. In this embodiment of the invention the modems are configurable as to either or both frequency and time division multiplexing. This hybrid multiplexing capability allows uninterrupted delivery of streaming video or audio on portion of the frequency spectrum while accommodating sporadic or bursty, e.g. computer-to-computer or computer-to-printer, communications in another portion of the spectrum shared via time division multiplexing.

In FIG. 3A graph 300 shows the above discussed DMT spectrum with a portion dedicated to PSTN 232, master tone (s) 234 and slave tone(s) 236. The remaining portion of the spectrum is split into two ranges 240 and 242. Range 240 spans frequencies $f_1$-$f_4$ and range 242 spans the relatively narrower range $f_4$-$f_5$. Range 240 is dedicated throughout time to the streaming video or audio link between the internet and TV 214 via modems 110 and 114 shown in FIG. 2A. Range 242 is time division multiplexed to allow round robin or other time slotted access by three different modem-to-modem links for computer-to-computer or computer-to-printer links.

FIG. 3A graph 300 shows frequency allocation during the first time interval $t_n$-$t_{n+1}$. During this interval range 240 is dedicated to the streaming video or audio link between modems 110 and 114 and range 242 is dedicated to the computer-to-printer link provided by modems 110 and 216 shown in FIG. 2A.

FIG. 3B graph 310 shows frequency allocation during the second time interval $t_{n+1}$-$t_{n+3}$. During this time interval range 240 remains dedicated to the streaming video or audio link between modems 110 and 114 and range 242 is re-purposed to the computer-to-computer link provided by modems 110 and 112 shown in FIG. 2A. The time interval dedicated to this computer-to-computer link, e.g. is relatively longer than either of the computer-to-printer time slots shown in FIG. 3A or 3B.

FIG. 3C graph 320 shows frequency allocation during the third time interval $t_{n+3}$-$t_{n+4}$. During this interval range 240 remains dedicated to the streaming video or audio link between modems 110 and 114 and range 242 is re-allocated to the computer-to-printer link provided by modems 112 and 216 shown in FIG. 2A.

The modem's dynamic configurability allows it to support hybrid access protocols, e.g. frequency and time division multiplexing, which in turn provides simultaneous support for streaming video requiring high bandwidth and quality of service (QOS) and reduced bandwidth for bursty traffic associated with, file transfers and other transfers between computer and printer, or camera or computer.

Figure 4:
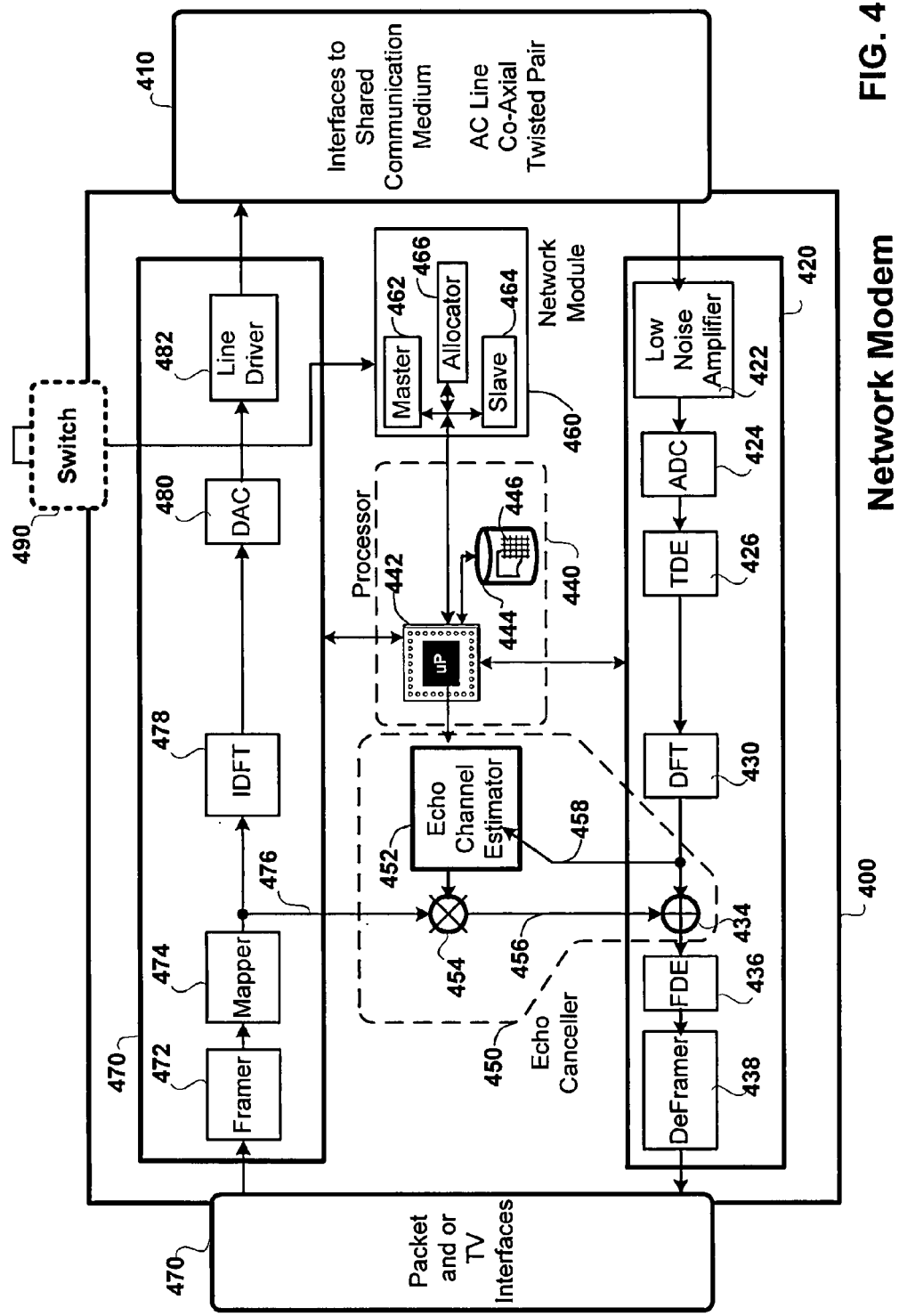
FIG. 4 is a hardware block diagram of an embodiment of the network modem.

FIG. 4 is a hardware block diagram of an embodiment of the network modem 400. The network modem 400 includes both shared and discrete components coupled to one another to form a transmit path 470 and a receive path 420. The transmit and receive path couple at one end via interface 410 to the shared communications medium, e.g. twisted wire pair, 110V AC line, coaxial cable. The transmit and receive path couple at the opposing end to an Ethernet or other packet based network appliance, Television, or other mixed or multimedia device via interface 470.

The transmit and receive paths operate under the control of the network module 460 and the processor 440. The processor includes a micro-controller 442, memory 444 and associated program code and lookup tables 446. The network module and specifically the master sub-module 462 and slave sub-module 464 portions thereof support the automatic configuration of the modem into either the master or slave mode. In static embodiments of the invention master or slave mode may be determined by switch 490. In dynamic embodiments of the invention master or slave mode is determined dynamically based on the state of the network. In a dynamic embodiment of the invention the determination of which mode the modem assumes is based on a determination of the presence or absence of an active master on the network, and resultant activation of the corresponding one of the master sub-module 462 or slave sub-module 464 responsive thereto. The first modem to assume master mode handles the synchronization and bandwidth allocation for all remaining modems. In the slave mode each modem requests bandwidth from the master, receives an allocation of bandwidth from the master, and configures it's transmit and receive paths to correspond to the bandwidth allocated by the master. The processes associated with the network module master and slave mode processes are set forth in further detail in FIG. 7. The processor handles the determination of and subsequent configuration of the transmit and paths to support the desired FDMA and or TDMA allocation of duplex communication channels for each modem as determined by the master module of the modem which has assumed master mode.

Bandwidth allocation is also handled by the network module 460 as well, and specifically the allocator sub-module 466 thereof. Bandwidth allocation may in alternate embodiments of the invention be dynamic or static. Dynamic allocations of bandwidth may be implemented using either or both FDMA and or TDMA. Dynamic bandwidth as determined by the allocator sub-module may be based on a number of criteria including file type; file size; session type, e.g. streaming or intermittent (a.k.a. bursty); and quality of service (QOS) guarantees, for example. In an embodiment of the invention dedicated frequency range(s) without time division multiplexing, are allocated to streaming media, e.g. video and audio, based on the relatively high data rates and QOS requirements of streaming media. Remaining portions of the frequency spectrum may be sub-divided in either or both time and frequency to handle the access requirements of remaining links dedicated to intermittent file transfers such as printer or computer to computer file transfer links. Static bandwidth allocation including either or both FDMA and or TDMA allocations may be pre-programmed into each modem or may also be user selected via one or more switches, e.g. switch 490. In either static or dynamic bandwidth allocation embodiments of the invention the modem in master mode synchronizes the network including frame rate and if the access protocol calls for it, time division multiplexing. The processes associated with the network module bandwidth allocation are also set forth in further detail in FIG. 7.

The dedicated components of the transmit and receive paths support DMT modulation and demodulation of data. In an embodiment of the invention the transmit path includes: a framer 472, a constellation mapper 474, an inverse discrete Fourier transform (IDFT) module 478, a digital-to-analog (DAC) converter 480 and a line driver 482. The framer frames one or more discrete channels of incoming data into frames, while the mapper maps each frame of data into discrete tones of successive tone sets, each of which corresponds to a symbol. The IDFT transforms the discrete tones in each tone set from the frequency to the time domain. The DAC converts the digital time domain data from the IDFT to an analog signal for amplification onto the shared communication medium via the line driver.

In an embodiment of the invention the receive path includes: a low noise amplifier 422, an analog-to-digital (ADC) converter 424, a time domain equalizer (TDE) 426, a discrete Fourier transform (DFT) module 430, an adder 434, a frequency domain equalizer (FDE) 436 and a DeFramer 438. The received signal is amplified by the low noise amplifier and then converted from analog to digital by the ADC. The ADC's output is then equalized in the time domain by the TDE and passed to the DFT for transformation from the time to the frequency domain. The output of the DFT is subject to echo cancellation in the frequency domain to remove leakage from the modem's own transmit path and then subject to frequency domain equalization in the FDE. The received data is then deframed in the deframer and passed to the corresponding TV, computer, or network attached peripheral to which the modem is coupled.

In this embodiment of the invention a configurable frequency domain echo channel estimator 450 is used for cancelling leakage between the modem's transmit and receive paths. This allows each communication channel allocated to opposing modem pairs to support duplex communication.

This spectral re-use doubles the bandwidth available on the network. The echo canceller includes an echo channel estimator 452 which accepts feedback 458 of the received signal and dynamically re-determines the weighting factors to apply in multiplier 454 to the transmitted signal on line 476. The output 456 of the multiplier is summed in summer 434 with the received signal, thereby normalizing the received signal by removing there from the leakage from the modem's transmit path to the receive path. The output of the summer 434 is passed to the FDE 436 for equalization therein and subsequently to the DeFramer 438 for deframing the data into one or more discrete communication channels.

Figure 5:
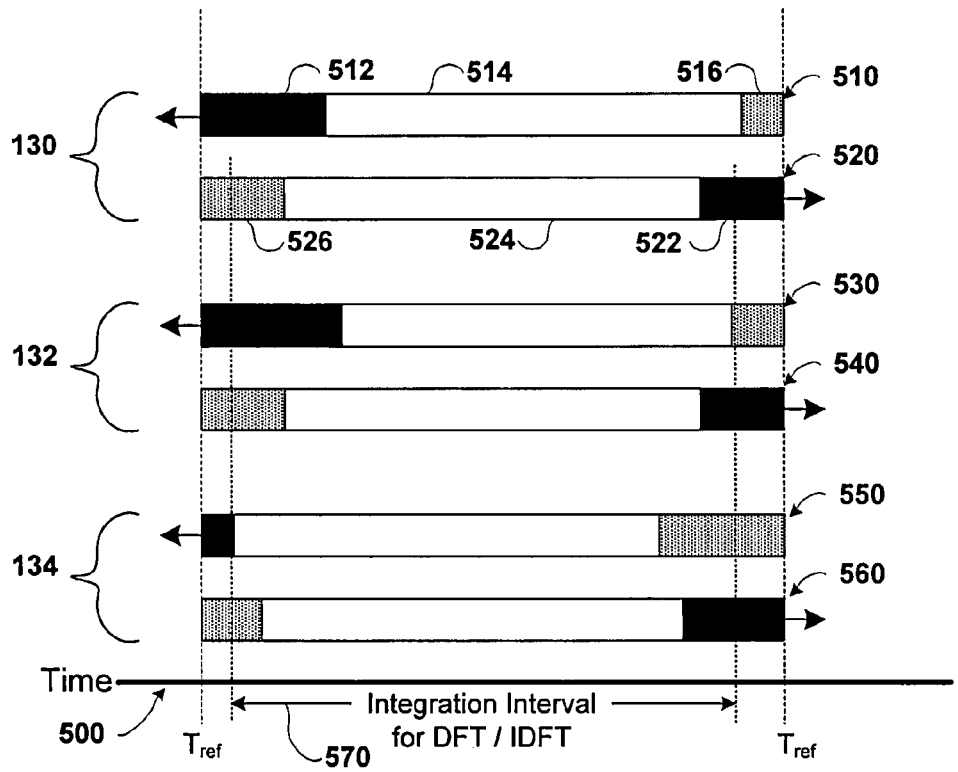
FIG. 5 is a graph of the integration intervals for Fourier Transforms performed by an embodiment of the network modem shown in FIG. 4.

FIG. 5 is a graph 500 of the integration intervals for Fourier Transforms performed by an embodiment of the modem shown in FIG. 4. In this embodiment of the invention the symbol frames 510, 520 associated with the duplex communication channel 130 (See FIG. 1C), the symbol frames 530, 540 associated with the duplex communication channel 132 (See FIG. 1C) and the symbol frames 550, 560 associated with the duplex communications channel 134 (See FIG. 1C) are shown. Each includes a payload portion, and a cyclic prefix and suffix. The cyclic prefix 512, payload 514 and cyclic suffix 516 for frame 510 are shown. The cyclic prefix 522, payload 524 and cyclic suffix 526 for frame 520 are also shown. Each of the Fourier transform processors in each of the three modems 110, 112, 114 forming the network shown in FIG. 1C are all, in this embodiment of the invention, substantially synchronized with one another. All are synchronized by the master modem to a common integration interval 570 during which the corresponding DFTs and IDFTs are performed.

Figure 6:
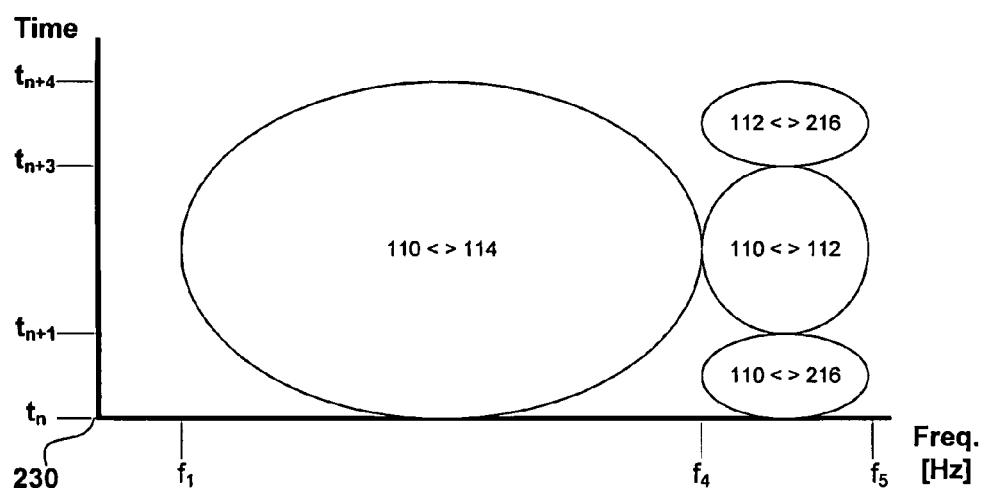
FIG. 6 is a graph of duplex link/channel allocation using a combination of frequency and time division to support multiple access to the shared communication medium shown in FIG. 2A.

FIG. 6 is a graph 230 of the hybrid time and frequency division multiple access supported by the modem shown in FIG. 4. The vertical axis corresponds to time and the horizontal axis corresponds to frequency. A representative hybrid FDMA and TDMA bandwidth allocation is shown, and corresponds to that set forth in FIGS. 3A-3C. Communications between modems 110 and 114 are subject only to frequency division multiplexing, and as such are limited to the spectral range $f_1$-$f_4$. Communications between modems 112-216, 110-112 and 110-216 are subject to both frequency and time division multiplexing. The frequency allocated to these channels is confined to the spectral range $f_4$-$f_5$. The time intervals allocated to these channels are: time interval $t_n$-$t_{n+1}$ for communications between modems 110-216, time interval $t_{n+1}$-$t_{n+3}$ for communications between modems 110-112, and time interval $t_{n+3}$-$t_{n+4}$ for communications between modems 112-216.

Figure 7:
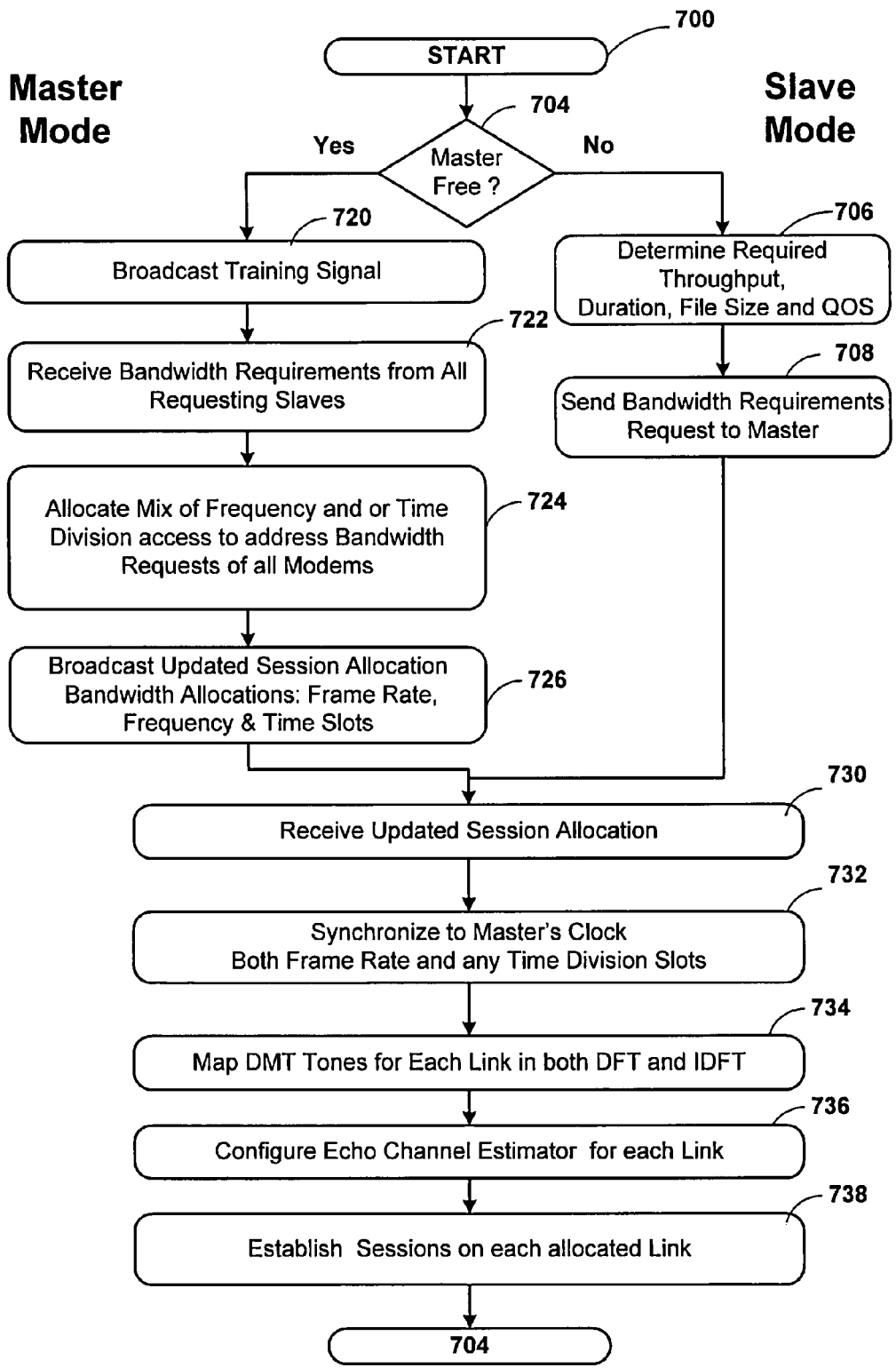
FIG. 7 is a process flow diagram for an embodiment of the invention in which each modem is dynamically configurable into either master or slave mode.

FIG. 7 is a process flow diagram for an embodiment of the invention in which each modem is dynamically configurable into either master or slave mode. After initialization in start block 700 control passes to decision process 704. In decision process 704 the modem determines the network status, i.e. whether or not there is an existing master on the network to which it is coupled. In an embodiment of the invention this determination may be based on the presence of a signal generated by a master on the pilot tone(s) 234 (See FIGS. 2B-2C) reserved for the master's broadcast.

If a master signal is detected in decision process 704, the modem enters slave mode the initial step of which is to determine required throughput, duration, file size and quality of service (QOS) in process 706. Next in process 708, the modem in slave mode sends the bandwidth requirements determined in the prior step to the master using one of the tone(s) 236 (See FIGS. 2B-2C) reserved for slaves communication with the master.

If no master signal is detected in decision process 704, the modem enters master mode the initial step of which is to seize the master pilot tone(s) 234 (See FIGS. 2B-2C) and asserts a training signal thereon in process 720. Then in process 722 the modem in master mode receives on the reserved slave tone(s) 236 (See FIGS. 2B-2C) the bandwidth requirements from all requesting slaves. Next in process 724 the master module 448 (See FIG. 4) of the modem in master mode, determines a mix of frequency and or time division multiplexing of modem-to-modem channels which meets the bandwidth requirements of all modems including the master and requesting slaves. In an embodiment of the invention dedicated frequency range(s) without time division multiplexing, are allocated to streaming media, e.g. video and audio, based on the relatively high data rates and QOS requirements of streaming media. Remaining portions of the frequency spectrum are sub-divided in either or both time and frequency to handle the access requirements of remaining links dedicated to intermittent file transfers such as computer-to-printer or computer-to-computer file transfer links. Then in process 726 the allocated channel a.k.a. session information is broadcast on the reserved master tone(s) 234 the bandwidth allocations determined in the prior step.

After steps 708 or 726 discussed above the modem, whether in master or slave mode, executes process 730, by updating its channel, a.k.a. session, allocation to correspond with the determination made by the master in process 724. Then in process 732 the transmit and receive paths 470 and 420 respectively (See FIG. 4) are synchronized to the master modems clock using the master's synchronization signal broadcast on the reserved master tone(s) 234 (See FIGS. 2B-2C). Then in process 734 the DMT tones are assigned to each link, a.k.a. channel, allocated by the master modem. In process 736 the echo channel estimator 450 (See FIG. 4) is configured to cancel out leakage from the transmit into the receive path of the modem, thereby allowing full duplex communications within each tone/sub-channel of each allocated channel. Next in process 738 sessions are established on each of the allocated links. Control then returns to process 704 for a redetermination of the master's availability. If the master goes down at any time, or the bandwidth requirements of a slave or master change the processes are all repeated, thereby allowing the network to dynamically respond to either loss of a master, or to changing bandwidth requirements in real time, and without downtime on the network.

Figure 8:
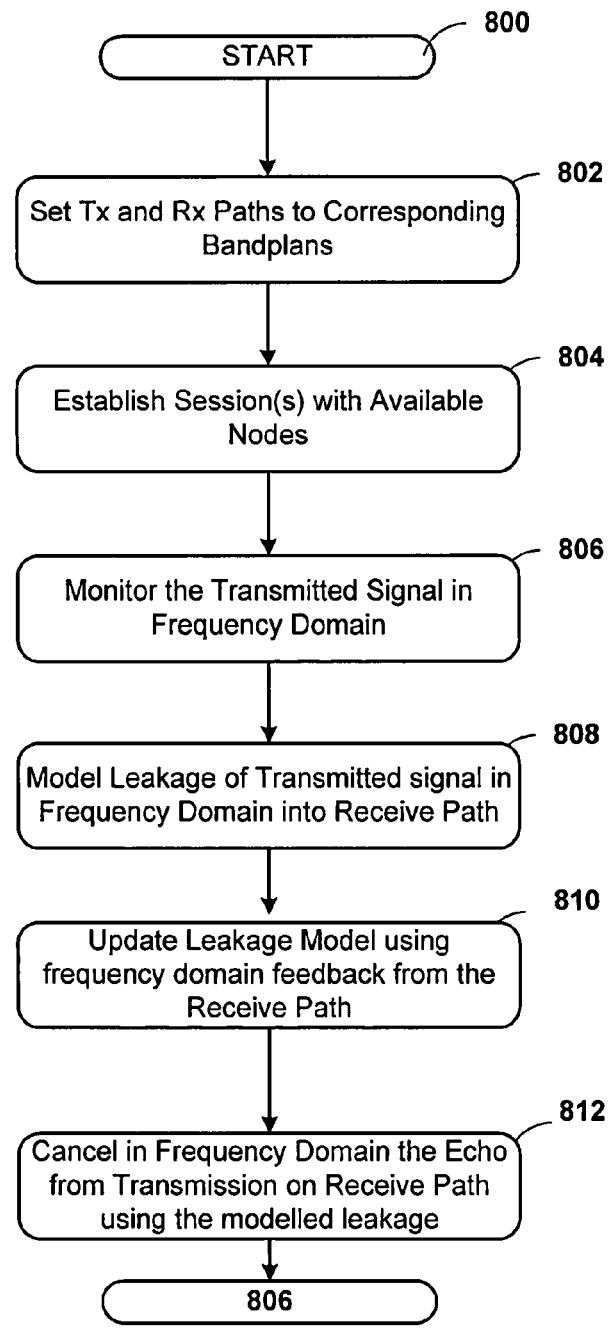
FIG. 8 is a process flow diagram for the processes associated with frequency domain echo cancellation.

FIG. 8 is a process flow diagram for the processes associated with frequency domain echo cancellation. After modem initialization in process 800, control passes to process 802 in which the transmit and receive paths of each modem are configured to correspond with the channel allocations broadcast by the modem in master mode. Then in process 804 network operation commences with the establishment of sessions between active network nodes, i.e. the network modems. In process 806 the transmitted signal in the frequency domain is monitored. In process 808 leakage of the transmitted signal into the receive path is modeled. In process 810 the model is updated using feedback from the receive path. In process 812 the leakage of the transmitted signal onto the receive path is canceled using the updated leakage model to remove the calculated leakage from the received signal. Control then returns process 806.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A communication system to establish a network among peripheral devices on a shared wired communication medium, the communication system comprising:
   at least three multi-tone modulated modems each configured to couple an associated peripheral device to the shared wired communication medium; and
   respective discrete and exclusive point-to-point communication links between pairs of the at least three multi-tone modulated modems using the shared wired communication medium,
   wherein each of the at least three multi-tone modulated modems includes:
      shared and discrete components coupled to one another to form a transmit path and a receive path configured for multi-tone modulation and demodulation of communications on the shared wired communication medium, including:
         a network module configured to communicate over the shared wired communication medium with network modules of remaining ones of the at least three multi-tone modulated modems to allocate respective dedicated frequency ranges each comprising one or more tones on the shared wired communications medium for establishing each of the discrete and exclusive point-to-point communication links between corresponding pairs of the at least three multi-tone modulated modems by which each multi-tone modulated modem and associated peripheral device communicates directly and simultaneously with each remaining one of the at least three multi-tone modulated modems on the shared wired communication medium.

2. The communication system of claim 1, wherein the shared and discrete components of each of the at least three multi-tone modulated modems further comprises:
   an echo canceller configured to substantially cancel leakage of the communications transmitted on the transmit path into the receive path and to enable each point-to-point communication link to support full duplex communications, thereby substantially increasing available bandwidth on the shared wired communication medium.

3. The communication system of claim 1, wherein the network module further comprises:
   an allocator which dynamically allocates bandwidth to each point-to-point communication link using at least one of frequency division multiple access (FDMA) and time division multiple access (TDMA).

4. The communication system of claim 3, wherein the dynamic allocation of bandwidth is performed such that each point-to-point communication link has a corresponding amount of bandwidth, with at least two of the discrete and exclusive point-to-point communication links having different amounts of bandwidth from each other.

5. The communication system of claim 1, wherein the shared wired communication medium comprises at least one of: a twisted pair phone line, a co-axial cable, an optical cable, an alternating current power line.

6. The communication system of claim 1, wherein the network module of each of the at least three multi-tone modulated modems further comprises:
   sub-modules configured to assume one of master or slave mode depending on a status of the network and in the slave mode to determine bandwidth requirements for the discrete and exclusive point-to-point communication links supported by the corresponding one of the at least three modems and in the master mode to allocate bandwidth among the discrete and exclusive point-to-point communication links supported by the at least three multi-tone modulated modems on the shared wired communications medium using at least one of frequency division multiple access (FDMA) and time division multiple access (TDMA).

7. A modem configured to couple an associated peripheral device to a shared wired communications medium shared with at least two other modems, and the modem comprising:
   shared and discrete components coupled to one another to form a transmit path and a receive path configured for multi-tone modulation and demodulation of communications on the shared wired communication medium, including:
      a network module configured to communicate over the shared wired communication medium with network modules of the at least two other modems to allocate respective dedicated frequency ranges each comprising one or more tones on the shared wired communications medium for establishing separate and exclusive discrete point-to-point communication links between corresponding pairs of the at least two other modems by which the modem and associated peripheral device communicates directly and simultaneously with each remaining one of the at least two other modems on the shared wired communication medium.

8. The modem of claim 7, wherein the shared and discrete components further comprise:
   an echo canceller configured to substantially cancel leakage of the communications transmitted on the transmit path into the receive path and to enable each point-to-point communication link to support full duplex communications, thereby substantially increasing available bandwidth on the shared wired communication medium.

9. The modem of claim 7, wherein the network module further comprises:
   an allocator which dynamically allocates bandwidth to each point-to-point communication link using at least one of frequency division multiple access (TDMA) and time division multiple access (TDMA).

10. The modem of claim 9, wherein the dynamic allocation of bandwidth is performed such that each point-to-point communication link has a corresponding amount of bandwidth, with at least two of the discrete and exclusive point-to-point communication links having different amounts of bandwidth from each other.

11. The modem of claim 7, wherein the shared wired communication medium comprises at least one of: a twisted pair phone line, a coaxial cable, an optical cable, an alternating current power line.

12. The modem of claim 7, wherein the network module further comprises:
   sub-modules configured to assume one of master or slave mode depending on a status of the network and in the slave mode to determine bandwidth requirements for the discrete and exclusive point-to-point communication links supported by the modem and in the master mode to allocate bandwidth among the discrete and exclusive point-to-point communication links supported by all modems on the shared wired communications medium using at least one of frequency division multiple access (FDMA) and time division multiple access (TDMA).

* * * * *

UNITED STATES PATENT AND TRADEMARK OFFICE
CERTIFICATE OF CORRECTION

PATENT NO. : 8,711,741 B1  
APPLICATION NO. : 11/807006  
DATED : April 29, 2014  
INVENTOR(S) : Heidari et al.

Page 1 of 2

It is certified that error appears in the above-identified patent and that said Letters Patent is hereby corrected as shown below:

In the Specification:

In Column 2, Line 30, delete "FIG. 2B-2C" and insert -- FIGS. 2B-2C --, therefor.

In Column 2, Line 56, delete "coaxial" and insert -- co-axial --, therefor.

In Column 3, Line 2, delete "virtual communications network VCN" and insert -- virtual communications network (VCN) --, therefor.

In Column 3, Line 62, delete "printer 216" and insert -- printer 218 --, therefor.

In Column 3, Line 66, delete "FIG. 2B-2C" and insert -- FIGS. 2B-2C --, therefor.

In Column 4, Lines 6-7, delete "public switched telephone line (PSTN)" and insert -- public switched telephone network (PSTN) --, therefor.

In Column 4, Line 29, delete "the is modem" and insert -- the modem --, therefor.

In Column 5, Line 40, delete "coaxial" and insert -- co-axial --, therefor.

In the Claims:

In Column 9, Line 7, in Claim 1, delete "moderns" and insert -- modems --, therefor.

In Column 9, Line 15, in Claim 1, delete "moderns" and insert -- modems --, therefor.

In Column 10, Line 43, in Claim 9, delete "(TDMA)" and insert -- (FDMA) --, therefor.

Signed and Sealed this  
Nineteenth Day of August, 2014

Michelle K. Lee  
*Deputy Director of the United States Patent and Trademark Office*

CERTIFICATE OF CORRECTION (continued)
U.S. Pat. No. 8,711,741 B1

In Column 10, Line 45, in Claim 10, delete "modern" and insert -- modem -- therefor.

In Column 10, Line 51, in Claim 11, delete "modern" and insert -- modem --, therefor.

In Column 10, Line 53, in Claim 11, delete "coaxial" and insert -- co-axial --, therefor.

In Column 10, Line 55, in Claim 12, delete "modern" and insert -- modem --, therefor.

In Column 10, Line 61, in Claim 12, delete "modern" and insert -- modem --, therefor.